United States Patent [19]
Hoffmann et al.

[11] 3,784,228
[45] Jan. 8, 1974

[54] REGULATING APPARATUS FOR A FLUID CONTROLLED CAR SUSPENSION

[75] Inventors: Hans-Jürgen Hoffmann, Schalksmuhle-Heedfeld; Friedhelm Fischer, Villigst, both of Germany

[73] Assignee: Hoesch Aktiengesellschaft, Dortmund, Germany

[22] Filed: July 17, 1972

[21] Appl. No.: 272,657

[30] Foreign Application Priority Data
Oct. 22, 1971  Germany............................ 2152601

[52] U.S. Cl.............................. 280/6 H, 280/124 F
[51] Int. Cl............................................ B60g 17/00
[58] Field of Search ........................ 280/6 H, 124 F

[56] References Cited
FOREIGN PATENTS OR APPLICATIONS
1,119,133  12/1961  Germany............................ 280/6 H
1,292,012  4/1969  Germany............................ 280/6 H

*Primary Examiner*—Philip Goodman
*Attorney*—Michael S. Striker

[57] ABSTRACT

A regulating apparatus for a motor car suspension has resilient shock absorbing supporting legs, each including a cylinder and a piston forming a working chamber in the cylinder connected by conduits with a pump started by a door switch of the car otherwise used for illuminating the interior of the car. The fluid pumped into the working chamber compensates an increased load, and a decreased load causes discharge of fluid from the working chamber, for maintaining the suspension at a normal level. Instead of a pump, an other pressure fluid source can be used which is connected by an electromagnetic valve with the working chamber when the door switch, or other control switch, is operated. The control switch can also be operated by the trunk lid, or be a manual switch operated by the driver.

12 Claims, 7 Drawing Figures

REGULATING APPARATUS FOR A FLUID CONTROLLED CAR SUSPENSION

BACKGROUND OF THE INVENTION

The present invention relates to a hydropneumatic resilient suspension regulated from the outside and particularly suited for motorcars.

Hydropneumatic resilient suspensions are known in which oil is pumped into a high pressure tank, from where the oil flows through regulating devices into resilient supporting legs including a cylinder and a movable piston. In order to prevent that during each swaying of the car, or when driving along a curve, oil enters the cylinders of the supporting legs, or is discharged therefrom, the regulating means are provided with delay devices. In addition to the high cost of the construction, there is the disadvantage that the regulation takes place at a delay, even if the car is loaded or unloaded.

Other hydropneumatic suspensions are known which operate without a high pressure tank, and in which a pump pumps the oil directly into the cylinders of the supporting legs. Such apparatus has a simpler construction, and also the advantage that no regulation takes place during driving along a curve, or during swaying of the car. However, it is disadvantageous that the start of the pump must be made by depression of a button by the driver, so that it is left to the driver to adjust the height of the supporting level. It is also possible to operate the pump for a predetermined time period until a given amount of oil is pumped into the cylinders of the supporting legs. In both constructions the level is not exactly regulated and adjusted.

SUMMARY OF THE INVENTION

It is one object of the invention to overcome the disadvantages of known resilient hydropneumatic suspensions, particularly for motorcars, and to provide a simple regulating system which is operative upon variations of the load, carries out an automatic regulation, and precisely adjusts the level of the supported parts of the car.

Another object of the invention is to use switches provided in standard cars, for example door and trunk switches, for controlling the level regulation.

In one embodiment of the invention, a pump having its own motor is used. An electric signal generator, such as a control switch, starts the entire regulating operation for which pressure responsive switches are used in the oil conduits between the pump and resilient supporting legs of the type described in U.S. Pat. Nos. 3,536,312 and 3,547,465, and also in the oil conduits between the resilient supporting legs and a discharge reservoir. The pressure responsive switches include a maximum pressure switch which disconnects the drive motor of the pump when after the compensation of an increased load, the flow to the supporting legs is closed, and a minimum pressure switch, which is closed, if after the compensation of a reduced load, the flow out of the supporting legs is ended.

In the event that a central source of fluid is provided, which may include a motor driven pump and a pressure storing container, the present invention also provides an electric signal generator, such as a control switch, which starts the regulation by pressure responsive switches provided in the oil conduits between an electromagnetic loading compensating valve and the resilient supporting legs, and also in the oil conduits between the resilient supporting legs and the low pressure discharge reservoir. The pressure responsive switches include a maximum pressure switch which closes a loading compensating valve if after an increased-load regulation the flow into the supporting legs is closed, and a minimum pressure switch which closes an electromagnetic unloading compensating valve, if after a reduced-load compensation, the flow out of the cylinders of the supporting legs is ended.

It is advantageous to use the door switch of a motorcar having the suspension which generally serves for illuminating the interior of the car. In addition to the door switches, a control switch manually operated by the driver may be used so that a regulating operation can be started at any time, if desired. Moreover, an electric level sensing switch may be used as control switch, which is responsive to relative displacement of the cylinder and piston of the supporting leg out of a normal position. Preferably a delay device is provided for delaying a response of the regulating means to the indication of the level sensing switch.

It is a particular advantage of the apparatus of the invention that the construction is simple and consequently economical, due to the fact that no high pressure storing container has to be provided, and no mechanical delay devices have to be used. As minimum pressure switch, a brake light switch may be used. The use of door contacts or trunk contacts provided for interior illumination is particularly advantageous, since upon opening of the door for entering of passengers, or of the trunk lid for storing suitcases, the regulating operation immediately starts. This is also of great importance for ambulances, since a stretcher with a patient can be inserted or taken out of the ambulance at the same level. The regulating apparatus of the invention can be used for regulation of the level in relation to one shaft, or to both shafts, and in the latter case, differently modified regulating apparatus according to the invention may be used for the front and rear shafts, and have conduits connected by a check valve circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
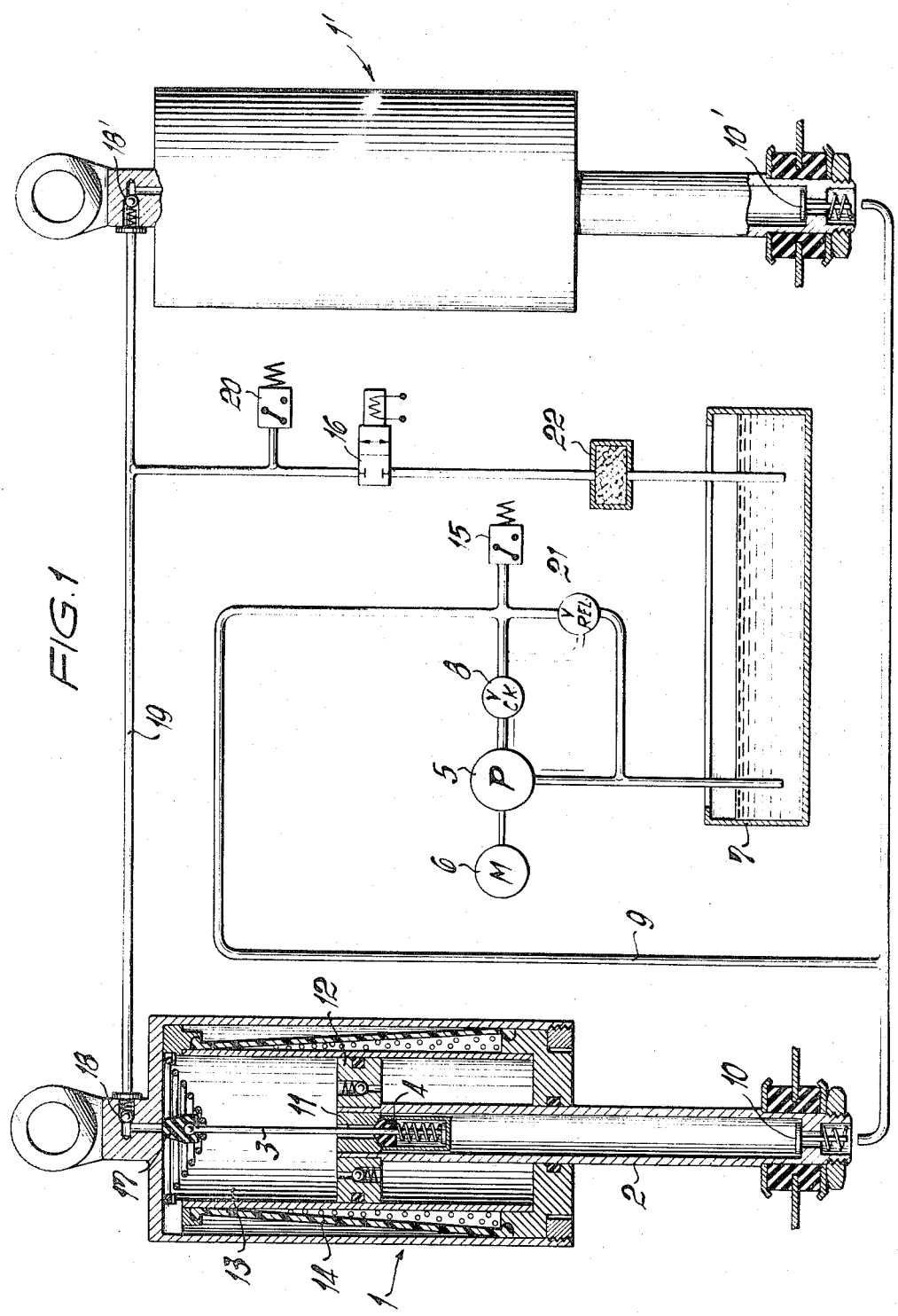
FIG. 1 is a schematic, partially sectional view, illustrating an embodiment in which two conduits are connected with each supporting leg.
Figure 7:
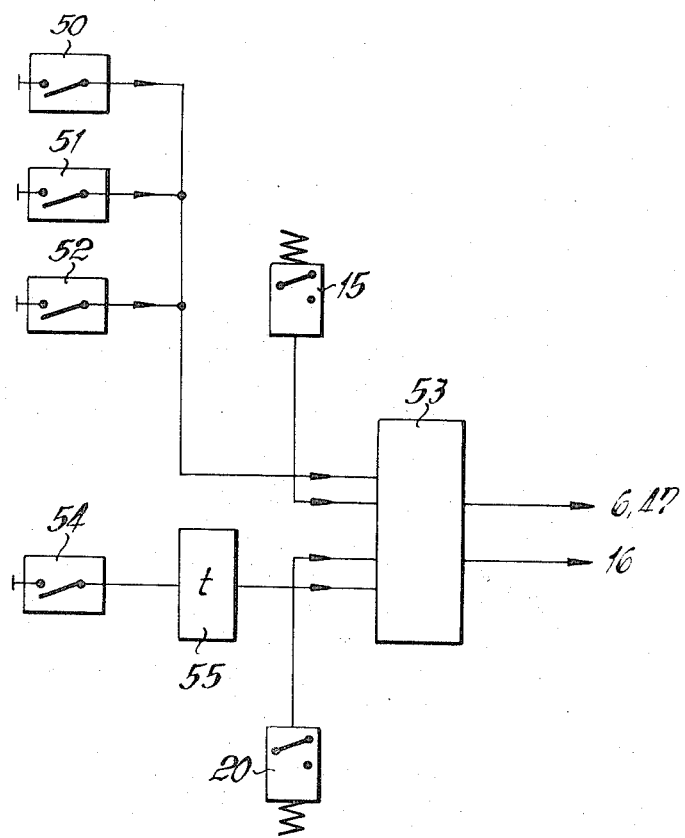
FIG. 7 is a diagrammatic view illustrating the electric circuit of the invention.

Referring first to the embodiment of FIG. 1, two resilient supporting legs 1 are shown interconnected by conduits 9 and 19, and since both supporting legs 1, 1' have the same construction, reference will be mainly made to supporting leg 1 which includes a piston 12, movable in a cylinder, and a hollow piston rod 2. An electric motor 6 is started when one of the control switches 50, 51, 52 shown in FIG. 7 is closed, the respective signal being transmitted through a distributing device 53 to which signals are supplied also by the maximum pressure switch 15 and the minimum pressure switch 20 which are pressure responsive. FIG. 7 also shows a level sensing switch 54 and a delay device 55 which are not used in the embodiment of FIG. 1.

As shown in FIG. 1, pump 5 discharges through a check valve 8 into a conduit 9 connected with a check valve 10 in the hollow piston rod 2, and with a check valve 10' in the hollow piston rod of supporting leg 1'. The maximum pressure switch 15 is responsive to the pressure in conduit 9. Conduit 19 contains the minimum pressure switch 20, and an electromagnetic unloading compensating valve 16 provided in a discharge conduit opening into a low pressure reservoir 7 and being provided with a filter 22.

When the car, provided with the regulating apparatus according to FIG. 1, is loaded, the hollow piston rod 2 moves into the working chamber 13 so that a rod 3 opens a loading control valve 4. If a regulating operation is now started by an electric switch, for example a door switch 50, which is connected with motor 6, motor 6 is started and drives pump 5 so that oil pumped from the reservoir 7 through the check valve 8, conduit 9, check valve 10, the hollow piston rod 2, and through an annular gap 11, formed by a bore in piston 12 through which rod 3 passes, into a working chamber 13 which is connected with a pneumatic resilient element 14, so that the increased pressure in working chamber 13 compensates the load acting on the supporting leg 1, and piston rod 2 moves out again until the loading control valve 4 closes the annular gap 11 whereby the increased load compensation operation is completed. When the supporting leg 1' has also reached again its normal level position, the pressure in conduit 9 rises until the maximum pressure switch 15 responds, and disconnects the motor 6 by a signal through the distributing device 53, shown in FIG. 7. If the load of the car is further increased, the loading control valve 4 is again opened, the pressure in conduit 9 drops, and the maximum pressure switch 15 starts motor 6 and pump 5 again so that the above-described operation is repeated after each load increase.

When the doors of the motorcar are closed, and the door switch operated after the regulating operation has been completed, the distributing device 53 does not permit energization of motor 6. The door switch 50 also effects the operation of an electromagnetic unloading compensating valve 16, which opens upon opening of the car door.

When the car is unloaded, the hollow piston rod 2 moves out of the cylinder of the supporting leg 1, so that rod 3 opens an unloading control valve 17. Oil flows out of the working chamber 13 through check valve 18 and conduit 19, and through the unloading compensating valve 16 back into the reservoir 7 until the pressure in the working chamber 13 is reduced, and piston 12 with piston rod 2 moves into the cylinder of the supporting leg 1 so that the unloading control valve 17 closes again, and conduit 19 is without pressure.

The minimum pressure switch 20 responds to the low pressure, and closes the unloading compensating valve 16. If the load on the car is further reduced, the unloading control valve 17 opens again, the pressure in conduit 19 rises, and the minimum pressure switch 20 opens the unloading compensating valve 16 again. This reduced load compensating operation is repeated until all doors are closed, and the distributing device 53 prevents further opening of the unloading compensating valve 16.

In order to prevent an overloading of the conduits by pressure peaks, an excess pressure valve 21 is provided for connecting conduit 9 with reservoir 7, if the pressure is excessively high. During driving along a curve, check valves 18, 18' and 10, 10' prevent the flow of oil from one of the supporting legs 1, 1' to the other.

Figure 2:
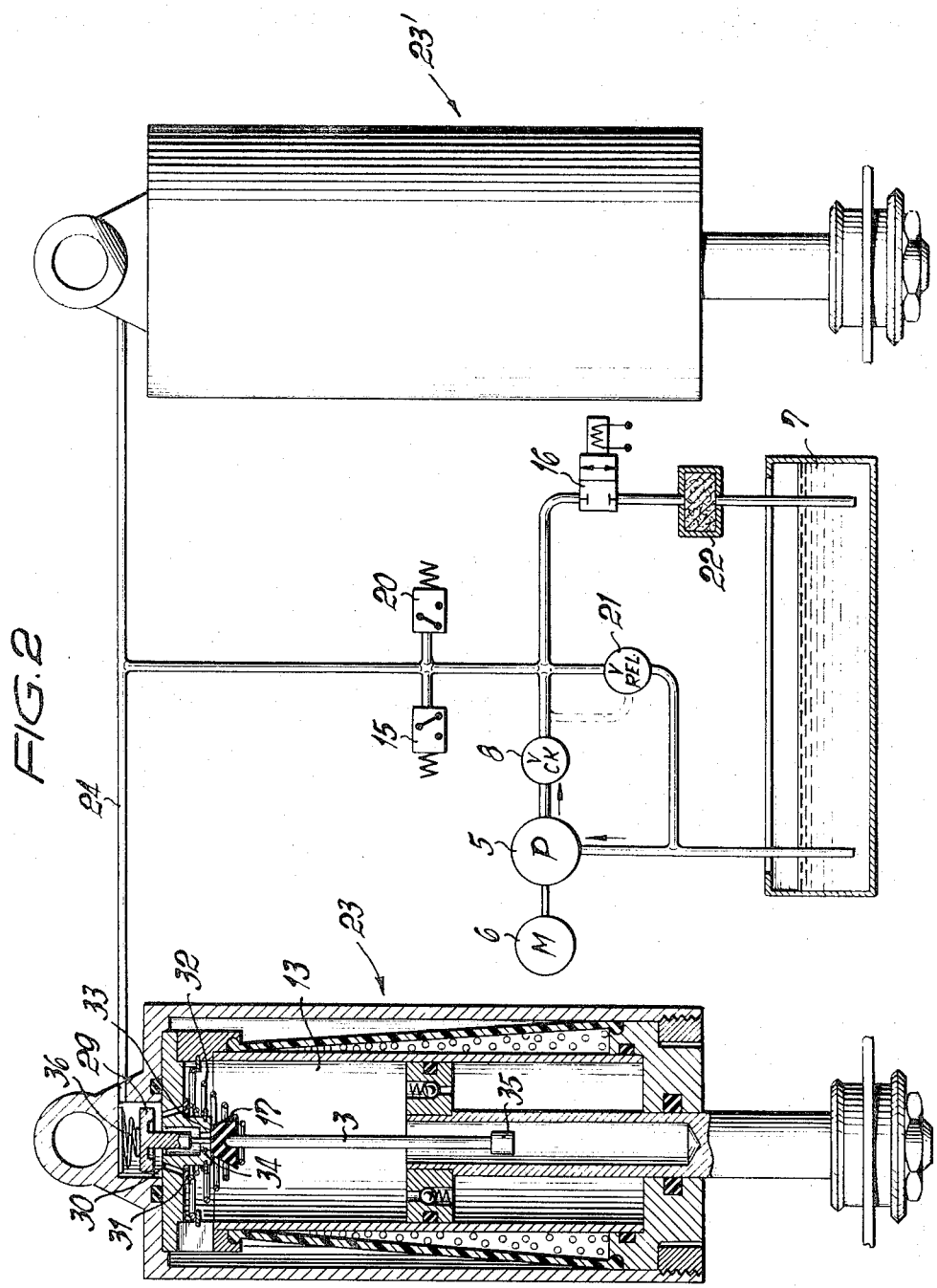
FIG. 2 illustrates a second embodiment with only one conduit connected with each supporting leg.

The apparatus of FIG. 2 is somewhat simplified, inasmuch as the resilient supporting legs 23, 23' have interior regulating devices which require only one conduit 24 for the supply of oil.

Upon opening of the door of the car, the reduced load compensation operation is started, and upon closing of the door, the increased load compensation operation is started by suitable door switches. Motor 6 and unloading compensating valve 16 must then be mutually locked.

During the increased load compensating operation, the unloading control valve 17 is held by a tension spring 32 on a valve seat 33 and closes an annular gap 34, while the lifting valve 29 is held open. When the level position is reached, the unloading control valve 7 is lifted by the rod 3 which has an end portion 3, while the lifting valve 29 is operated by valve spring 36 to close bores 30 so that no more oil can enter. When supporting leg 23' also arrives in its normal level position, motor 6 is disconnected by the maximum pressure switch 15.

When the reduced load compensation operation is started, the electromagnetic unloading compensating valve 16 opens, and the pressure in the single oil conduit 24 drops, while oil flows out of working chamber 13, through the annular gap 34, the lifting valve 29, oil conduit 24 and the unloading compensating valve 16 back into the reservoir 7. When the level position is reached, the unloading control valve 17 closes the annular gap 34. When the pressure in oil conduit 24 has dropped, the unloading compensating valve 16 is closed by the minimum pressure switch 20, and the reduced load compensation operation is completed.

Figure 3:
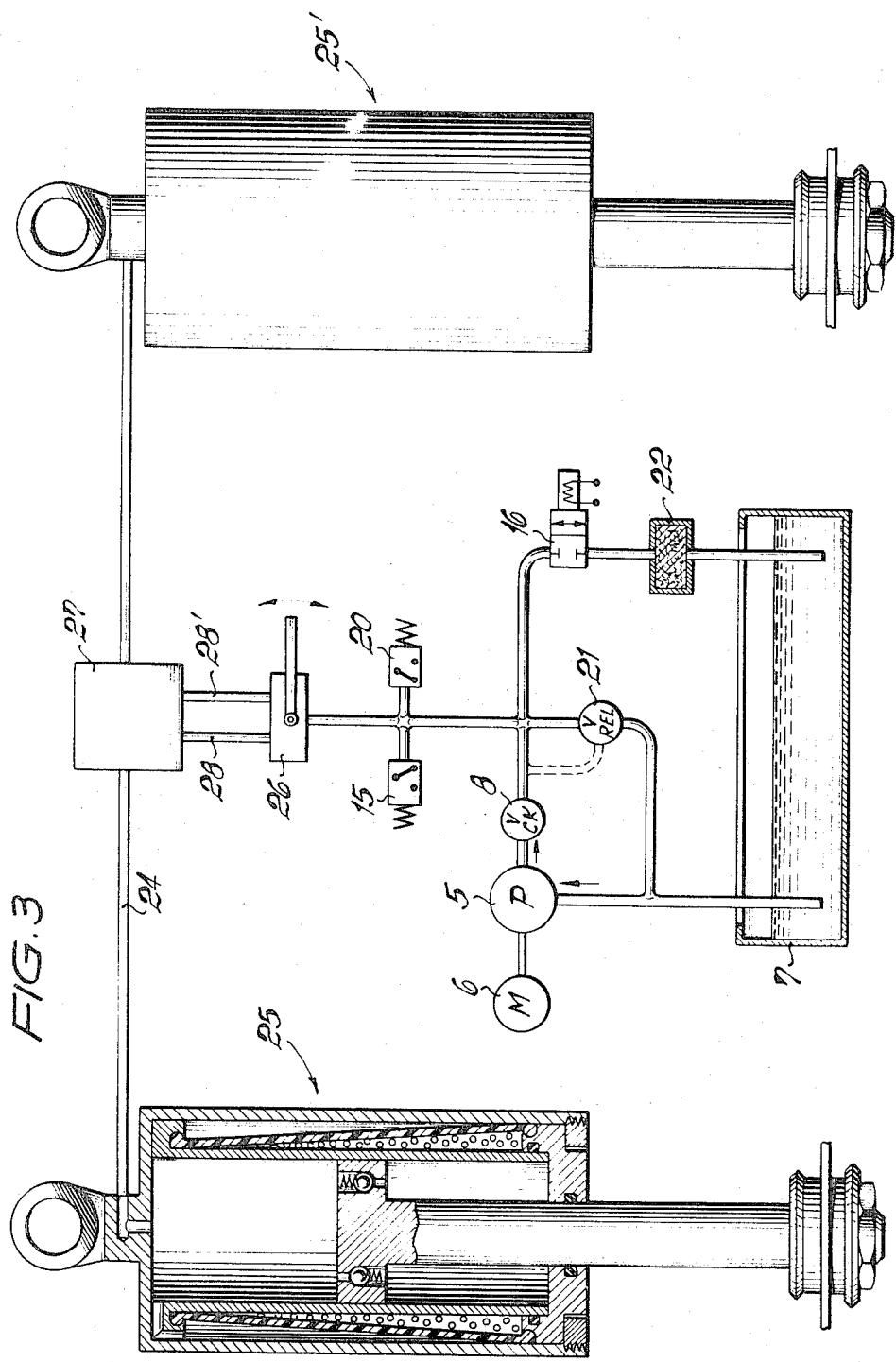
FIG. 3 illustrates a third embodiment in which the level is controlled from the outside by a level sensing switch.
Figure 4:
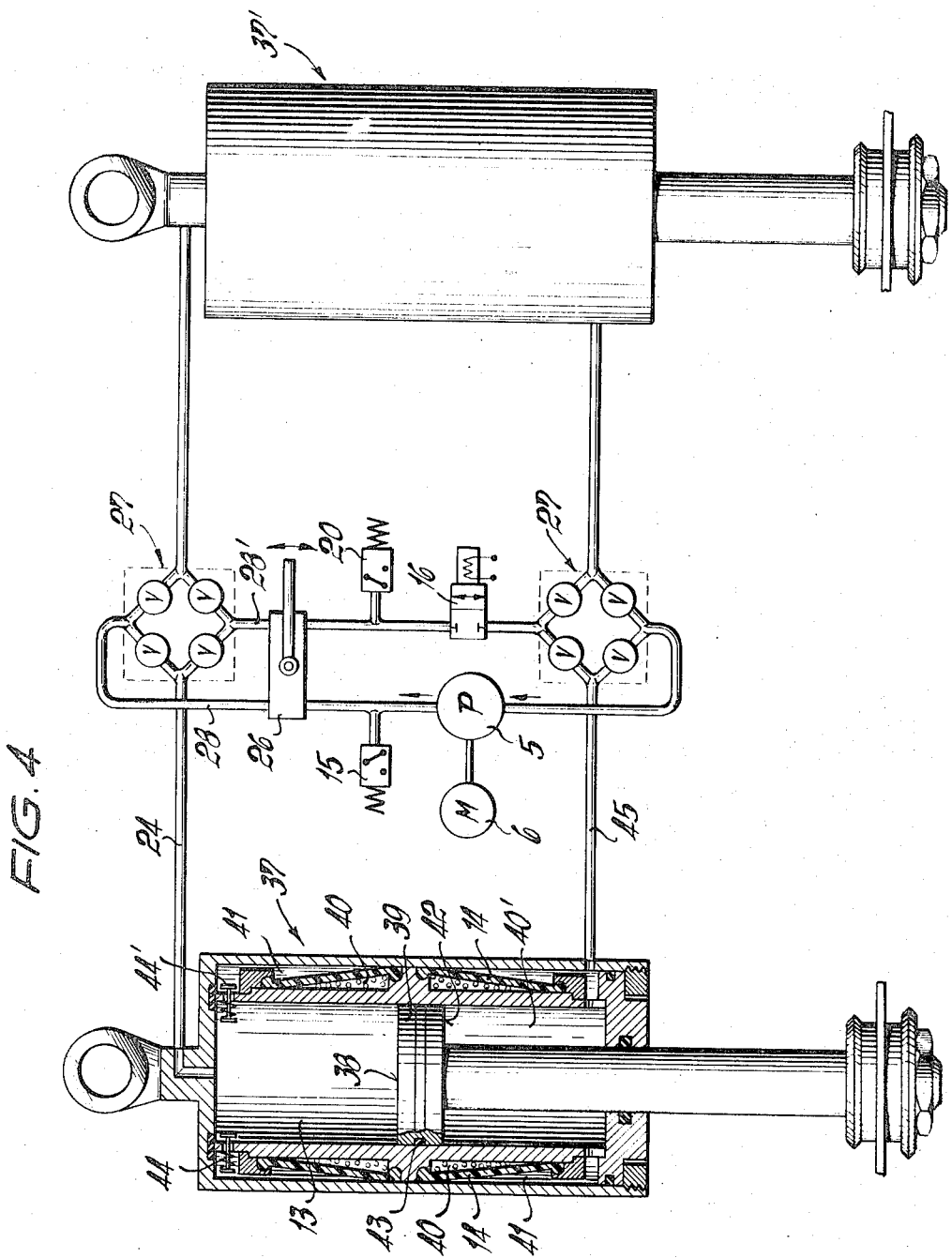
FIG. 4 illustrates a modification of the embodiment of FIG. 2 in which each supporting leg has two working chambers.

In the embodiment of FIG. 3 the elastic supporting legs 25, 25' are provided with oil by a level sensing switch 26 located outside of the supporting legs. Otherwise, the regulating operations are the same as previously described. In order to prevent that during driving along a curve, oil flows from one of supporting legs 25, 25' into the other, due to outward swaying or tilting of the car body, a check valve circuit 27, best shown in FIG. 4, is provided which includes two pairs of check valves disposed in parallel conduit portions of conduit 24. The check valves of each pair open in opposite directions. The check valve circuit 27 is also connected by conduits 28, 28' with the level sensing switch 26. Instead of check valves, valves operated by the centrifugal force may be used.

As shown in FIG. 4, the invention can also be applied to hydropneumatic two chamber supporting legs 37, 37'.

In the two chamber supporting legs 37, the pressure of a pneumatic resilient element 40 in a space 40' acts on an annular face 42 of piston 39. A sealing means 43 separates the working chamber 13 from the space 41. Damping valves 44, 44' are arranged between the working chamber 13 and the pneumatic resilient element 14. A common space, not shown, may be provided for the resilient supporting legs 37, 37'.

During the increased load compensation operation, pump 5 pumps oil from the storing space 41 through an oil conduit 45, and pumps the oil through the level sensing means 26 and conduits 28, 28' into the working chamber 13 until the level sensing means 26 stops the flow of oil whereupon the maximum pressure switch 15 disconnects motor 6 and stops the pump.

During the reduced load compensation operation, oil flows from working chamber 13 through conduits 24 and 28', level sensing means 26, unloading compensating valve 16, and conduit 45 into the storing space 41, until the flow of oil is interrupted at the level sensing means 26, and the minimum pressure switch 20 closes the unloading compensating valve 16. For increasing the stability of the car during driving along a curve, check valve circuits 27, as explained above, are provided between supporting legs 37, 37' in the oil conduits 25 and 45.

Figure 5:
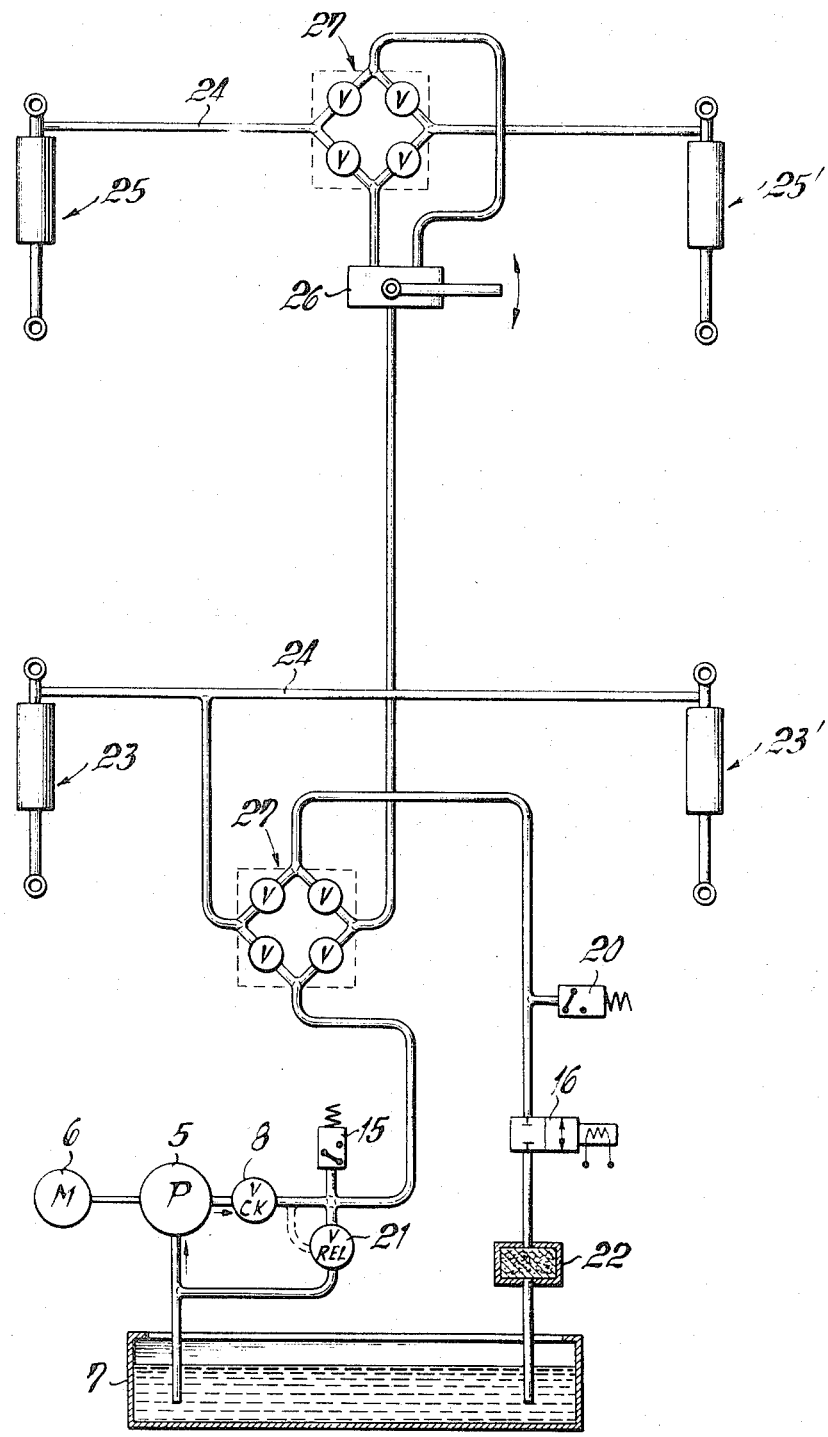
FIG. 5 illustrates an arrangement in which a regulating apparatus according to FIG. 3 is combined with the regulating apparatus according to FIG. 2, acting on the front and the rear shaft of the car.

In FIGS. 1 to 4, regulating apparatus has been described which cooperates with two resilient supporting legs cooperating with the same shaft. The invention can also be applied to a resilient suspension with regulating apparatus for the front and rear shafts, as shown in FIG. 5.

In this arrangement, th embodiments of FIG. 3 and FIG. 2 are combined, and corresponding reference numerals are used so that one pair of supporting legs 25, 25' is controlled by level sensing means 26, while the other pair of supporting legs 23, 23' is regulated as described with reference to FIG. 2. In order to prevent interaction of the two regulating devices, valve circuits 27 are provided for interconnecting the conduits 24 of the two devices.

Figure 6:
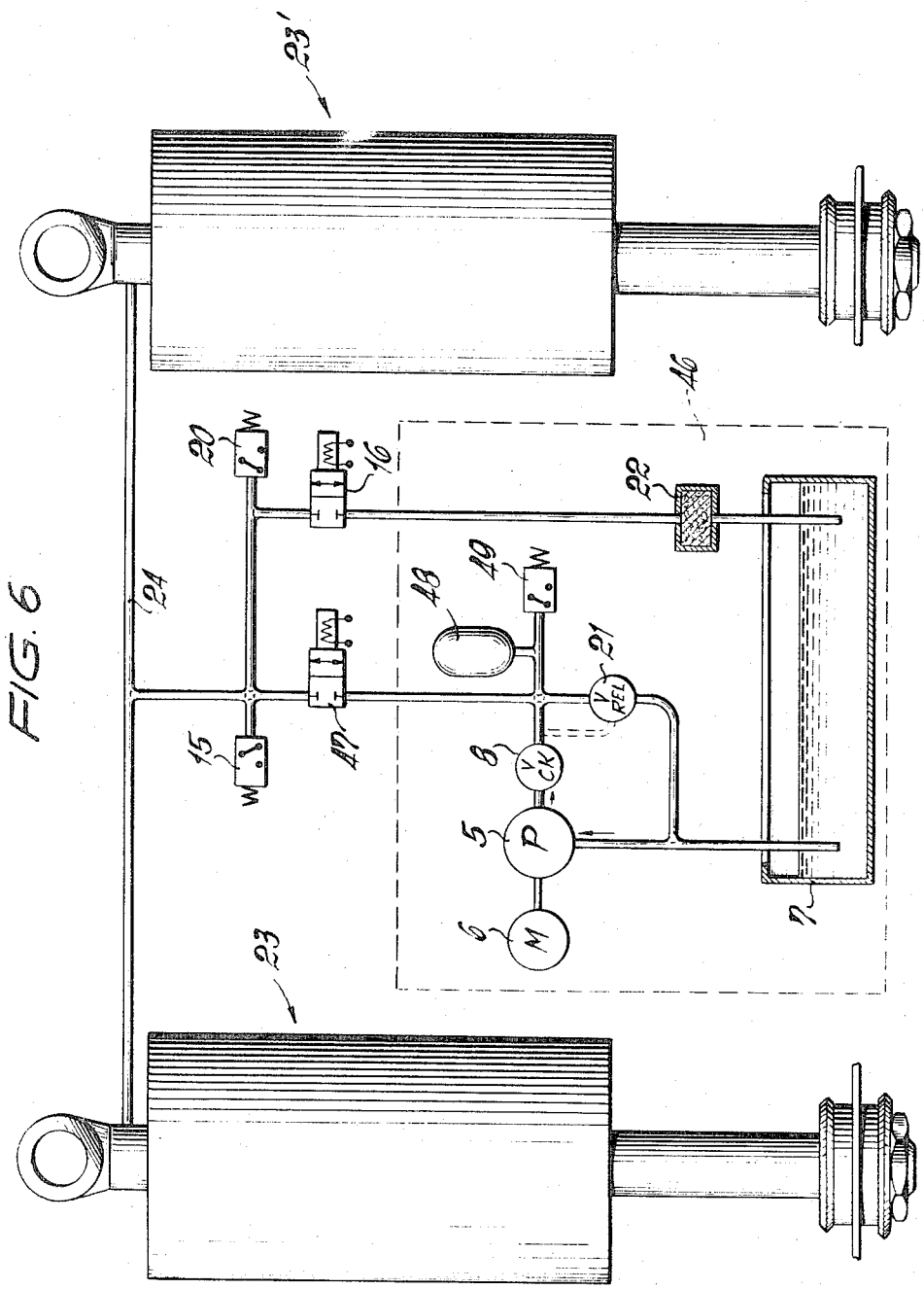
FIG. 6 is a schematic view illustrating another embodiment of the invention in which a central pressure source is used which is connected with the supporting legs by an electrically controlled loading compensating valve.

In a further embodiment of the invention shown in FIG. 6, a central source 46 of pressure oil is provided, and includes, as indicated by a broken line in FIG. 6, an electric motor 6 driving a pump 5, a check valve, a high pressure container, and a high pressure limit switch 49. When at the beginning of an increased load compensation operation, the control switch 50 is actuated, the distributing device 53 supplies the respective signal to the loading compensating valve 47 which responds and opens so that oil flows out of the pressure container 48 through conduit 24 into the working chambers of the supporting legs 23, 23'. After termination of the increased load compensating operation, the electromagnetic loading compensating valve 47 is closed either by the maximum pressure switch 15, or by the high pressure switch 49 of the central source 46 of fluid pressure. The reduced load compensating operation takes place as described with reference to FIG. 2.

If regulation during driving of the car is required in order to compensate for level changes due to temperature changes in the supporting legs, or due to a reduction of the weight of the fuel in the fuel tank, the regulating apparatus can be easily adapted to obtain the desired compensation.

For example, in addition to switch 50 shown in FIG. 7, which represents one or several door switches and/or a switch operated by the lid of the trunk, an additional control switch 51 may be provided which is either operated by a clock to close at a certain time, or operated by the odometer to close after the car has travelled a certain distance so that regulation can be started in several ways.

In order to have the option to start the regulating operation at will, whereupon the regulating operation continues automatically, a further control switch 52 is provided which is manually operated by the driver. The signal distributing device 53 to which also the maximum pressure switch 15 and the minimum pressure switch 20 are connected, the signals are transmitted to motor 6, or in the embodiment of FIG. 6 to loading compensating valve 47.

FIG. 7 also shows a level sensing means 54, corresponding to level sensing means 26, whose signal is delayed by a delay means 55 before being transmitted to the signal distributing and evaluating means 53. If a level sensing means 54 is mounted between a shaft and the upper structure of the car at a place neutral in relation to curves, the dealy time $t$ can be very short. If the delay time of delay means 55 is long, the level sensing means 54 cannot be mounted at a place which is neutral in relation to curves. If the level variation takes longer than the delay time $t$, the regulating operation is started. When the upper structure of the car swings back to the normal level position, the delay time $t$ starts again. If the car is at a standstill, and the door is closed with door switch 50, the regulation takes place immediately, since the signal from the door switch 50 does not pass through a delay means 55.

It will be understood that each of the elements described above, or two or more together, may also find a regulating apparatus for a fluid controlled car suspension differing from the types described above.

While the invention has been illustrated and described as embodied in an apparatus for regulating the level of a car at different loads, controlled by an electric door switch, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

We claim:

1. Regulating apparatus for a fluid controlled car suspension, comprising resilient supporting leg means including a cylinder, and a movable piston forming a working chamber in said cylinder, and having a normal position in which the car is at a normal level; and electric motor, and a pump driven by said motor to produce a pressure liquid; a low pressure discharge space; conduit means connecting said pump and said discharge space with said working chamber; regulating means in said conduit means including maximum pressure switch means for disconnecting said motor and stopping said pump when the pressure in said working chamber has compensated an increased load acting on said resilient supporting leg means and the pressure in said conduit means rises to a maximum, an electromagnetic unloading compensating valve for discharge into said discharge space, and a minimum pressure switch closing said unloading compensating valve when the pressure in said working chamber has compensated a reduced load acting on said resilient supporting leg means and the flow out of said working chamber into said discharge space ends; and control switch means for starting said motor located in the circuit of said maximum pressure switch means and of said minimum pressure switch.

2. Regulating apparatus as claimed in claim 1 wherein said control switch means includes a door switch of a car having the suspension, said door switch being connected with said motor and also adapted to control an electric light for illuminating the interior of the car.

3. Regulating apparatus as claimed in claim 2 wherein said control switch means includes a manual switch controlled by the driver of the car and being connected with said motor.

4. Regulating apparatus as claimed in claim 1 wherein said control switch means includes an electric level sensing means responsive to a relative displacement of said cylinder and said piston out of said normal position, and delay means for delaying a response of said level sensing switch.

5. Regulating apparatus as claimed in claim 1 comprising at least two resilient supporting leg means; and a check valve circuit connecting the conduit means correlated with said two supporting legs means, said check valve circuit including two pairs of check valves disposed in parallel conduit portions, respectively, the check valves of each pair opening in opposite directions.

6. Regulating apparatus as claimed in claim 1 wherein said regulating means include loading and unloading control valve means responsive to relative displacement of said cylinder and piston to open and permit flow into and out of said working chamber.

7. Regulating apparatus for a fluid controlled car suspension, comprising resilient supporting leg means including a cylinder and a movable piston forming a working chamber in said cylinder, and having a normal position in which the car is at a normal level; a central source of a liquid under pressure; a low pressure discharge space; conduit means connecting said source and said discharge space with said working chamber; control switch means; and regulating means in said conduit means including an electromagnetic loading compensating valve opened by said control switch means to connect said source with said working chamber, maximum pressure switch means for closing said loading compensating valve when the pressure in said working chamber has compensated an increased load acting on said resilient supporting leg means, and the pressure in said conduit means rises to a maximum, an electromagnetic unloading compensating valve for discharge into said discharge space, and a minimum pressure switch closing said unloading compensating valve when the pressure in said working chamber has compensated a reduced load acting on said resilient supporting leg means and the flow out of said working chamber into said discharge space ends in said normal position; said control switch means being located in the circuit of said maximum pressure switch means and of said minimum pressure switch.

8. Regulating apparatus as claimed in claim 7 wherein said control switch means includes a door switch of the car having the suspension, said door switch being connected with said electromagnetic loading regulating valve, and also adapted to control an electric light for illuminating the interior of the car.

9. Regulating apparatus as claimed in claim 7 wherein said control switch means includes a manual switch operable by the driver of the car and connected with said electromagnetic loading compensating valve.

10. Regulating apparatus as claimed in claim 7 wherein said control switch means includes an electric level sensing means responsive to relative displacement of said cylinder and piston out of said normal position, and delay means for delaying a response of said level sensing switch means.

11. Regulating apparatus as claimed in claim 7 comprising at least two resilient supporting leg means; and a check valve circuit connecting the conduit means correlated with said two supporting leg means, said check valve circuit including two pairs of check valves disposed in parallel conduit portions, respectively, the check valves of each pair opening in opposite directions.

12. Regulating apparating as claimed in claim 1 wherein said regulating means include loading and unloading control valve means responsive to relative displacement of said cylinder and piston to open and permit flow into and out of said working chamber.

* * * * *